US007199898B2

(12) United States Patent
Shirai

(10) Patent No.: US 7,199,898 B2
(45) Date of Patent: Apr. 3, 2007

(54) DEVELOPING DEVICE AND IMAGE FORMING APPARATUS

(75) Inventor: Masanari Shirai, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 873 days.

(21) Appl. No.: 09/875,015

(22) Filed: Jun. 7, 2001

(65) Prior Publication Data

US 2002/0054773 A1 May 9, 2002

(30) Foreign Application Priority Data

Jun. 9, 2000 (JP) ............................ 2000-173546

(51) Int. Cl.
*G06F 15/00* (2006.01)
*G06K 1/00* (2006.01)
*G06K 15/22* (2006.01)

(52) U.S. Cl. .................. 358/1.4; 358/1.14; 270/10.01; 270/11; 270/10.14; 399/111; 399/159; 399/222; 399/269

(58) Field of Classification Search ................ 399/111, 399/269, 159, 222; 358/1.14
See application file for complete search history.

(56) References Cited

U.S. PATENT DOCUMENTS 3,575,139 A * 4/1971 Nuzum ....................... 399/230
4,098,228 A 7/1978 Ruckdeschel et al. ...... 118/658
4,512,658 A * 4/1985 Winkelmann ............... 399/361
4,994,853 A * 2/1991 Fukuchi et al. ............... 399/12
5,229,821 A * 7/1993 Fujii .......................... 399/28
5,300,987 A * 4/1994 Aoyama et al. .............. 399/96
5,471,286 A * 11/1995 Tanaka ....................... 399/167

FOREIGN PATENT DOCUMENTS

JP 58-85461 5/1983
JP 4-340989 11/1992
JP 7-13438 1/1995
JP 7-160062 6/1995

* cited by examiner

*Primary Examiner*—Twyler Lamb
*Assistant Examiner*—Yixing Qin
(74) *Attorney, Agent, or Firm*—Fitzpatrick, Cella, Harper & Scinto

(57) ABSTRACT

A developing device including: a first developer carrying member for carrying a developer to develop a latent image formed on an image bearing member; a first regulating member, disposed on one end of a longitudinal direction of the image bearing member, for regulating a gap between the image bearing member and the first developer carrying member; a second developer carrying member for carrying a developer to develop the same latent image formed on the image bearing member; and a second regulating member, disposed on the one end of the longitudinal direction of the image bearing member, for regulating a gap between the image bearing member and the second developer carrying member, wherein the first and second regulating members are disposed without being superposed upon each other in the longitudinal direction.

6 Claims, 4 Drawing Sheets

DEVELOPING DEVICE AND IMAGE FORMING APPARATUS

BACKGROUND OF THE INVENTION

1. Field of the Invention

The present invention relates to an image forming apparatus in which an electrophotographic process or an electrostatic recording processing is used and a developing device for use in the image forming apparatus, particularly to image forming apparatuses such as a copying machine, printer, and facsimile machine, and a developing device for use in the image forming apparatus.

2. Related Background Art

In a conventional image forming portion in image forming apparatus such as a copying machine, an image forming process comprising: charging a photosensitive member as an image bearing member by a charging device; exposing an image of an original to light in an exposure position by an exposure optical system to form an electrostatic latent image on a peripheral surface of the photosensitive member; developing the electrostatic latent image formed on the peripheral surface of the photosensitive member by a developing device to form a developer (toner) image; applying a voltage to a transferring device and transferring the toner image to a transferring material; cleaning the photosensitive member with a cleaner after the image is transferred from the photosensitive member; and performing pre-exposure charging to eliminate a remaining charge, is repeated to form the images.

In the aforementioned developing device, a single developer carrying member (hereinafter referred to as a developing sleeve) is disposed at a constant gap from the photosensitive member. In order to regulate the gap, an abutment roller method is generally used in which the gap is determined by a difference between an outer diameter of a rotary regulating member (abutment roller) coaxially disposed with respect to the developing sleeve and an outer diameter of the developing sleeve, and the gap is further ensured by pressing the developing sleeve toward the photosensitive member.

However, the developing device having the single developing sleeve in the conventional image forming portion cannot catch up with a high speed (copy speed-up). In general, for a peripheral speed of the developing sleeve, the developing sleeve rotates at the speed of about 150% of the peripheral speed of the photosensitive member to develop the image. In order to increase the speed, the peripheral speed of the developing sleeve must be set to 200% or more of the peripheral speed of the photosensitive member; otherwise a supply of developer becomes insufficient and a copy density is lowered. However, when the peripheral speed of the developing sleeve is increased, the increased peripheral speed causes fusion bond of the developer by temperature rise of an end of the developing sleeve, and other problems.

Therefore, there has heretofore been proposed a developing device which is provided with a plurality of developing sleeves and used without largely increasing the peripheral speed of the developing sleeve and which can achieve a high speed. In the developing device, positioning means for securing a constant gap between the photosensitive member and each developing sleeve is preferably disposed with high precision in order to maintain developing properties. However, in the conventional developing device, it is difficult to dispose the developing sleeves to be close to one another.

SUMMARY OF THE INVENTION

An object of the present invention is to provide a developing device in which a first developer carrying member can be disposed to be as close to a second developer carrying member as possible.

Another object of the present invention is to provide an image forming apparatus in which a first developer carrying member can be disposed to be as close to a second developer carrying member as possible.

Further objects of the present invention will be apparent upon reading the following detailed description.

DESCRIPTION OF THE PREFERRED EMBODIMENTS

An embodiment of a developing device to which the present invention is applied and an image forming apparatus provided with the developing device will be described hereinafter with reference to the drawings.

First, a schematic constitution of an image forming portion in the image forming apparatus according to the present invention will briefly be described with reference to FIG. 4. In the present embodiment a copying machine will be described as an example of the image forming apparatus, but the present invention can also be applied to image forming apparatuses such as a printer and facsimile machine. Additionally, the image forming apparatus to which the present invention can be applied is not limited to the image forming apparatus shown in FIG. 4. The present invention can also be applied to the image forming apparatus whose constitution is variously changed.

Figure 4:
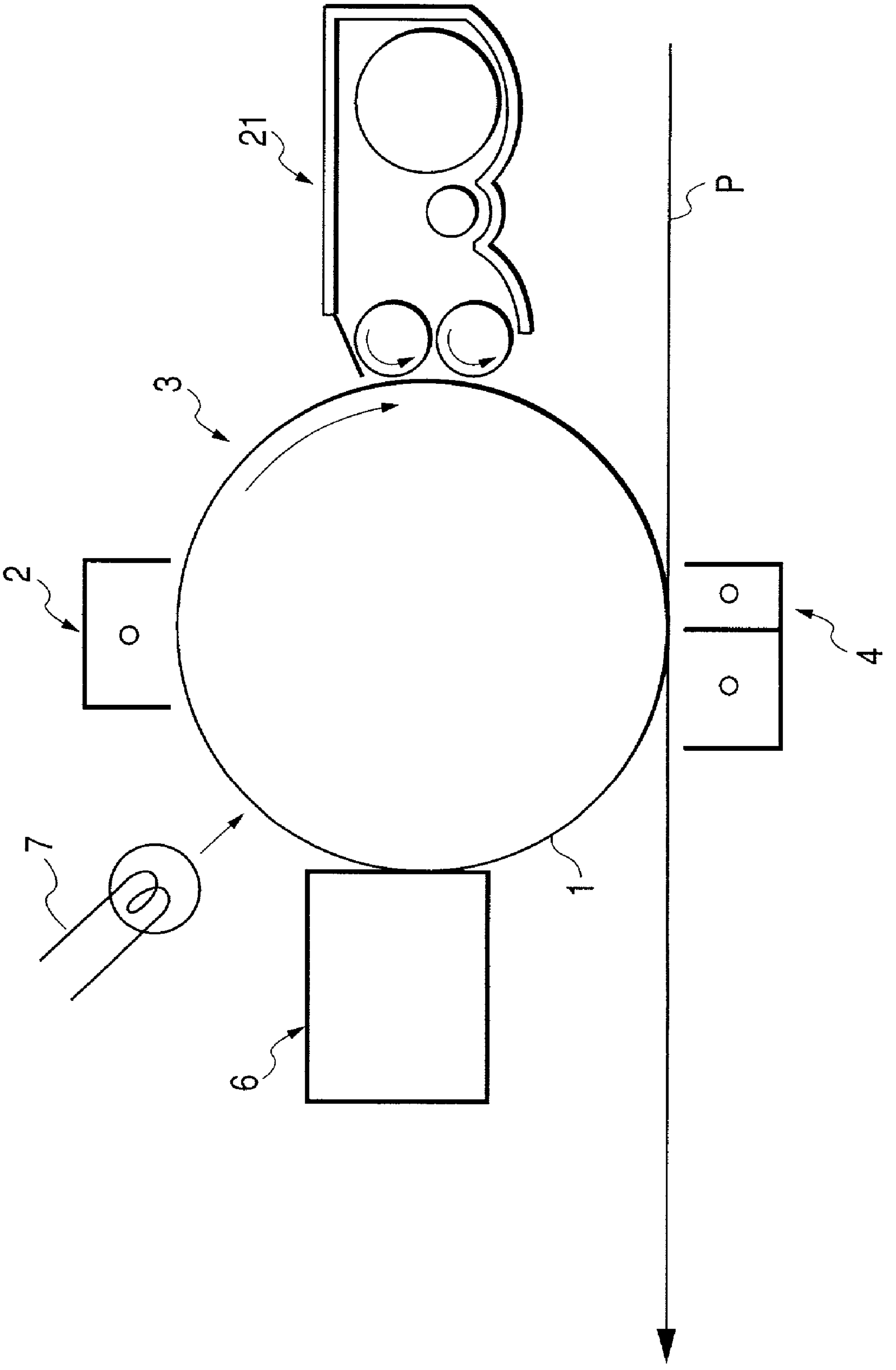
FIG. 4 is a schematic constitution view of an image forming portion in an image forming apparatus.

In the image forming portion shown in FIG. 4, a photosensitive member 1 as an image bearing member is charged by a charging device 2, and an image of an original is exposed to light in an exposure position 3 by an exposure optical system so that an electrostatic latent image is formed on a peripheral surface of the photosensitive member 1. The electrostatic latent image formed on the peripheral surface of the photosensitive member 1 is developed by a developing device 21 to form a developer (toner) image, and the toner image is transferred to a transferring material P by applying a voltage to a transferring device 4. The toner image is fixed as a permanent image onto the transferring material P by a fixing device.

After the transferring of the toner image, toner remaining on the photosensitive member 1 is removed by a cleaner 6, and the member is exposed to light by a pre-exposure device 7 so that a remaining charge is eliminated from the photosensitive member 1 and initialization is achieved. The image forming process is repeated to form the image on the subsequent transferring material P.

The developing device to which the present invention is applied will next be described in detail with reference to FIG. 1 to FIG. 3.

Figure 1:
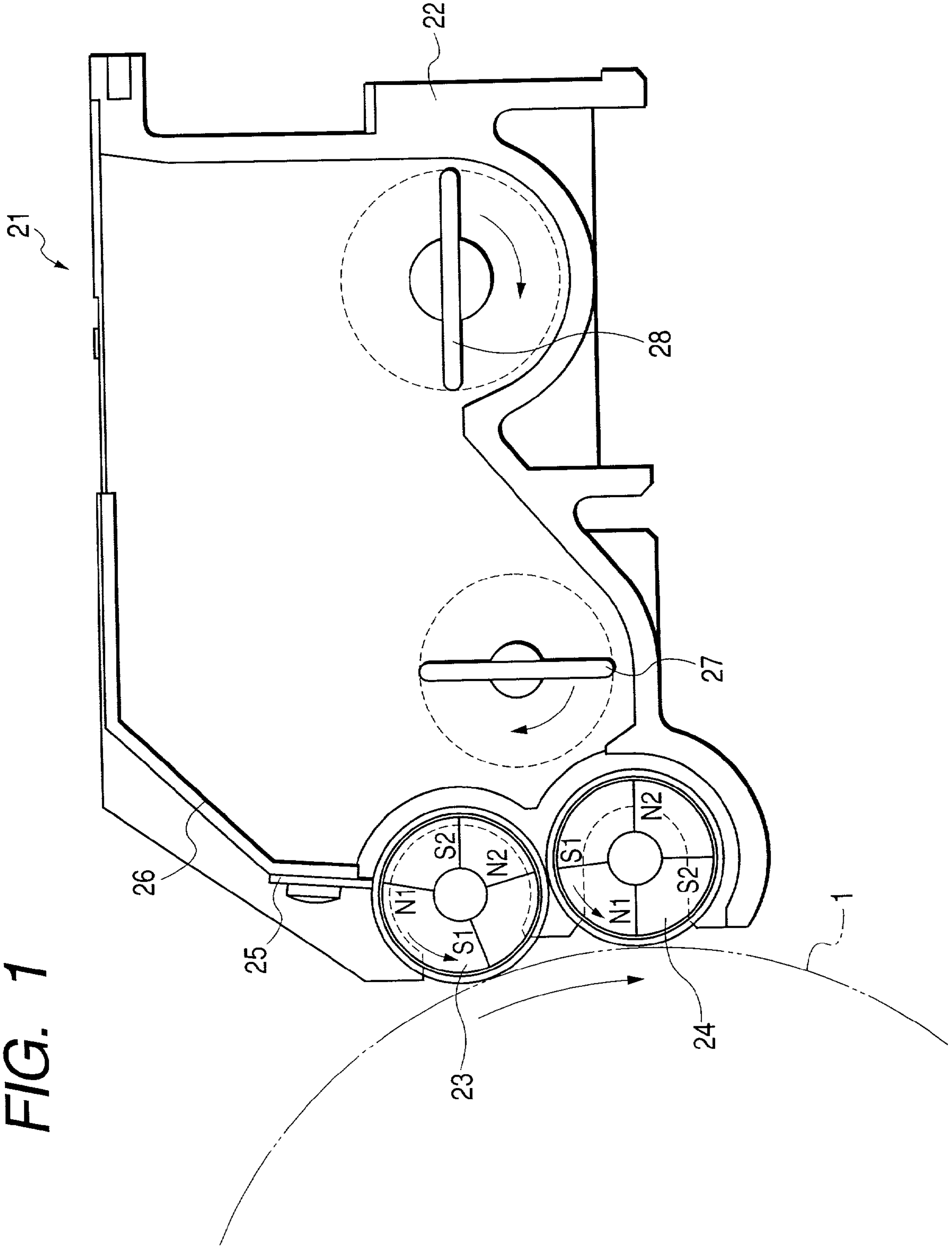
FIG. 1 is a schematic sectional constitution view of a developing device to which the present invention is applied.

FIG. 1 is a schematic sectional constitution view of the developing device to which the present invention is applied. In FIG. 1, reference numeral 21 denotes the developing device, and 22 denotes a developing container for containing a developer (mono-component developer (toner) in the present embodiment). Reference numeral 23 denotes a first developing sleeve provided with a magnet fixed inside as first magnetic field generation means for generating a magnetic field and rotatably supported by the developing container 22. The first developing sleeve is disposed along the longitudinal direction of the photosensitive member. Numeral 24 denotes a second developing sleeve provided with a magnet fixed inside as second magnetic field generation means for generating the magnetic field and rotatably supported by a rocking member described later. The second developing sleeve is disposed along the longitudinal direction of the photosensitive member 1. Additionally, the first and second developing sleeves 23 and 24 are constituted to rotate in the same direction as a rotation direction of the photosensitive member 1 in a developing portion (indicated by the arrows in FIG. 1).

A developing step will next be described in which the same electrostatic latent image formed on the photosensitive member 1 is developed by the first and second developing sleeves 23 and 24.

On the side of the first developing sleeve 23, the developer in the developing container is supplied onto the first developing sleeve 23 by the first magnetic field generation means, and a blade 25 regulates a layer thickness of the developer on the first developing sleeve 23. The developer with the regulated layer thickness on the first developing sleeve 23 is carried to the developing portion with rotation of the first developing sleeve 23, and adheres to the electrostatic latent image by a developing electric field (alternating electric field). The developing electric field is formed by applying a vibration voltage constituted of superimposed AC and DC voltages to the first developing sleeve 23.

On the other hand, on the side of the second developing sleeve 24, the developer in the developing container is supplied onto the second developing sleeve 24 by the second magnetic field generation means, and the supplied developer is regulated to have a predetermined layer thickness between the second developing sleeve 24 and the first developing sleeve 23. The developer with the regulated layer thickness on the second developing sleeve 24 is carried to the developing portion with rotation of the second developing sleeve 24, and adheres to the electrostatic latent image by the developing electric field (alternating electric field). Since the first developing sleeve 23 serves to regulate the layer thickness of the developer on the second developing sleeve 24, it is preferable to set a distance between the first developing sleeve 23 and the second developing sleeve 24 to a desired value. The developing electric field is formed by applying the vibration voltage constituted of superimposed AC and DC voltages to the second developing sleeve 24.

Additionally, since the developer is vibrated/moved in a gap (developing portion) between the first and second developing sleeves 23, 24 and photosensitive member 1 during developing, it is important to secure a size of the gap between the first and second developing sleeves 23, 24 and photosensitive member 1.

As described later, an abutment roller (cylindrical member) 29 which abuts on the peripheral surface of the photosensitive member 1 to secure and regulate the size of the gap (distance) between the first developing sleeve 23 and the photosensitive member 1 is disposed on a rotation shaft of the first developing sleeve 23. An abutment roller 30 is similarly disposed on a rotation shaft of the second developing sleeve 24.

Additionally, the abutment rollers 29, 30 are disposed on opposite ends in the longitudinal direction of the first and second developing sleeves 23, 24, respectively. By the abutment rollers 29, 30 being disposed on the opposite ends of the first and second developing sleeves 23, 24, the peripheral surfaces of the photosensitive member 1 and first developing sleeve 23, or the peripheral surfaces of the photosensitive member 1 and second developing sleeve 24 are disposed in parallel with each other in the longitudinal direction of the developing sleeve, and the aforementioned gap becomes constant. Therefore, the longitudinal direction of the photosensitive member 1 is substantially the same as the longitudinal direction of the first and second developing sleeve 23, 24.

As described above, a developing area can be enlarged without largely increasing a peripheral speed of the first and second developing sleeves 23, 24 as compared with the conventional art. Therefore, even when an image forming speed (developer image forming speed) is increased, a problem of the aforementioned fusion bond phenomenon of the developer caused by a temperature rise of the end of the developing sleeve can be solved.

For the aforementioned reason, the first and second developing sleeves 23, 24 are disposed to be close to each other in such a manner that the gap between the opposite sleeves is in a range of 0.4 to 0.8 mm, and is set at 0.4 mm in the present embodiment.

A holding member 26 fixed to the developing container 22, and the developer regulating blade 25, held by the holding member 26, as developer regulation means for regulating the layer thickness of the developer carried by the first developing sleeve are disposed above the first developing sleeve 23.

Moreover, agitating members 27, 28 for agitating the developer in the container and carrying the developer toward the first and second developing sleeves are disposed inside the developing container 22.

In the developing device 21 constituted as described above, the photosensitive member 1 and first developing sleeve 23, or the photosensitive member 1 and second developing sleeve 24 are disposed opposite to and close to each other at a predetermined distance.

Figure 2:
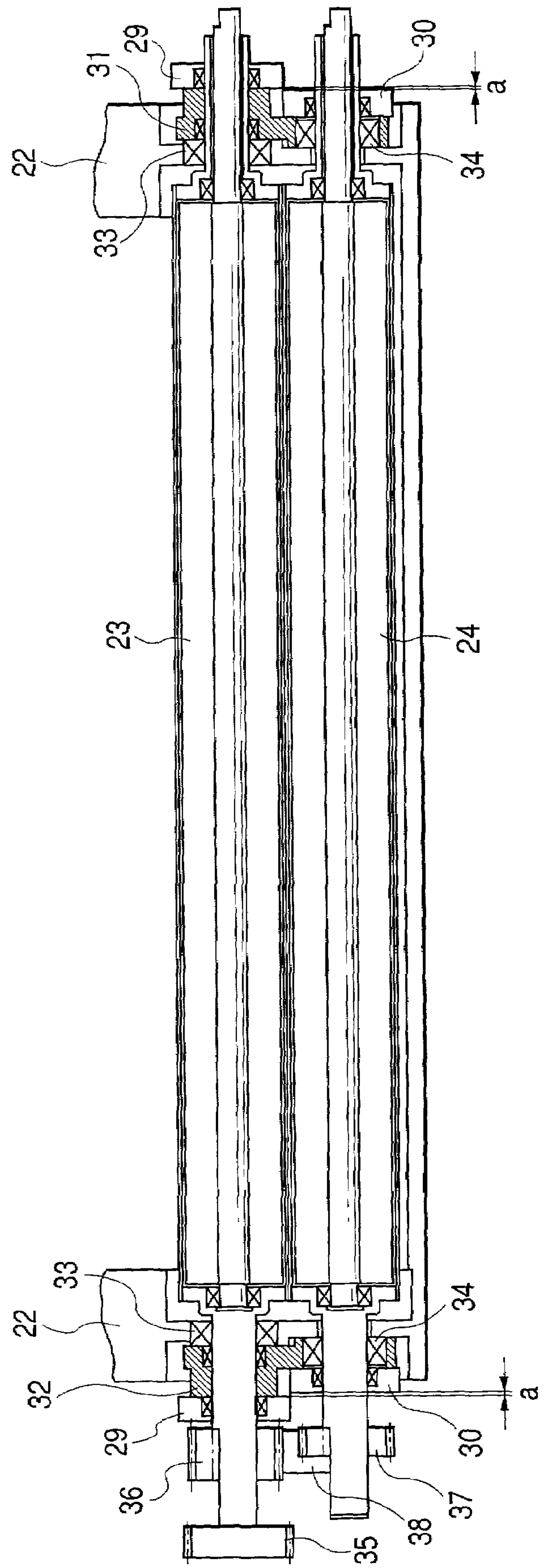
FIG. 2 is a sectional view taken along an axial direction of a developing sleeve in the developing device of the present invention.

FIG. 2 is a sectional view along an axial direction of the developing sleeves 23, 24 (the same direction as the longitudinal direction of the photosensitive member). As shown in FIG. 2, opposite ends of the first developing sleeve 23 are rotatably supported on the developing container 22 by bearings 33, and rocking members 31, 32 (hatched portions in FIG. 2) and abutment rollers 29 as the regulating members are rotatably supported.

For the rocking members 31, 32, bearings 34 are disposed to rotatably support the second developing sleeve 24 in such a manner that the gap between the first developing sleeve 23 and the second developing sleeve 24 forms a predetermined interval. The second developing sleeve 24 rotatably supports the abutment roller 30 as the regulating member.

Here, the abutment roller 29 of the first developing sleeve 23 and the abutment roller 30 of the second developing sleeve 24 are rotatably supported with an interval, indicated by the reference character “a”, formed therebetween as shown in FIG. 2 in such a manner that the rollers are prevented from being superposed upon each other in the axial direction (longitudinal direction). In this constitution, the first developing sleeve 23 can be as close to the second developing sleeve 24 as possible. Therefore, the layer thickness of the developer on the second developing sleeve 24 can effectively be regulated by the first developing sleeve 23, and the developing device 21 can be miniaturized.

Moreover, since the abutment rollers 29, 30 are disposed on the first and second developing sleeves 23, 24 without being superposed upon each other, the abutment rollers 29, 30 can be prevented from abutting on the same peripheral surface of the photosensitive member 1. The rollers 29, 30 prevent the same peripheral surface of the photosensitive member 1 from being excessively abraded, and life of the photosensitive member can be lengthened. Since the rollers 29, 30 can prevent the same peripheral surface of the photosensitive member 1 from being excessively abraded, the gap (distance) from the photosensitive member regulated by the rollers 29, 30 can be maintained over a long time. Therefore, a satisfactory developer image can be formed over a long term by the developing device.

In FIG. 2, a rotation driving input gear 35 is disposed on the shaft of the first developing sleeve 23 and a rotation driving force is inputted from a drive source to the gear 35 to thereby rotate the first developing sleeve 23. Moreover, the second developing sleeve 24 is rotated/driven by transmitting the force to a gear 37 from a gear 36 driven by the driving force from the rotation shaft of the first developing sleeve via an idler gear 38 rotatably supported by the rocking member 32.

Figure 3:
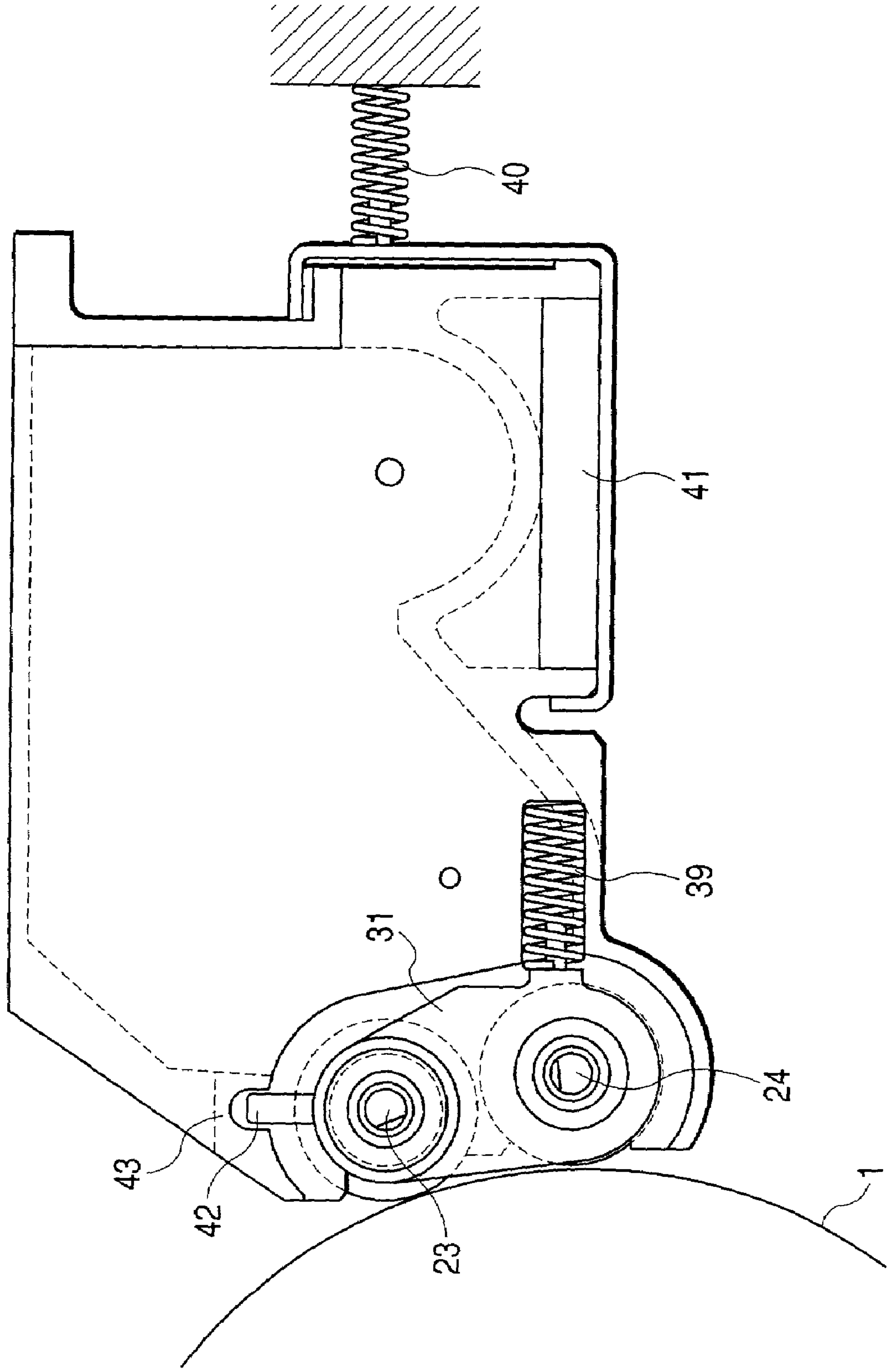
FIG. 3 is a side view of the developing device of the present invention.

FIG. 3 is a side view of the developing device 21, and an explanatory view of pressing means for the rocking members 31, 32 in the developing device 21. As shown in FIG. 3, the rocking member 31 supported on the shaft of the first developing sleeve 23 supports the second developing sleeve 24 at the predetermined distance, and a pressing member 39 as pressing means uses the shaft of the first developing sleeve 23 as a support to press the second developing sleeve 24 toward the photosensitive member 1. Additionally, the pressing member 39 is similarly disposed on the side of the rocking member 32 disposed opposite to the rocking member 31, and constituted to perform independent rocking/pressing operations on the respective sides. Therefore, parallelism with the photosensitive member of the second developing sleeve can satisfactorily be maintained.

Moreover, the rocking member 31 is provided with a protrusion 42 for determining a rocking range, and the protrusion meshes with a groove 43 of the developing container 22 and determines upper and lower limit values of a rocking angle. Furthermore, the developing device 21 is supported by a support member 41 of the developing device (developing unit), and pressed toward the photosensitive member 1 by a pressing member 40.

As described above, an abutment portion of the abutment roller 29, 30 to the photosensitive member 1 protrudes from the peripheral surface of the developing sleeve 23, 24. For example, the peripheral surface of the first developing sleeve 23 is in a position apart from the peripheral surface of the photosensitive member 1 by a difference (about 0.23 mm in the present embodiment) between a radius of the abutment roller 29 and a radius of the first developing sleeve 23. On the other hand, the peripheral surface of the second developing sleeve 24 is pressed toward the photosensitive member 1 by the rocking member 31 and pressing member 39 while the interval between the first developing sleeve 23 and the second developing sleeve 24 is maintained at a constant value. Thereby, similarly as the first developing sleeve 23, the peripheral surface of the second developing sleeve 24 is in a position apart from the peripheral surface of the photosensitive member 1 by a difference between a radius of the abutment roller 30 and a radius of the second developing sleeve 24.

According to the present embodiment, the first developing sleeve 23 is disposed to be close to the second developing sleeve 24, the sleeves can integrally be constituted in the developing device 21, and the developing device can therefore be miniaturized.

Moreover, since the abutment rollers 29, 30 are disposed on the first and second developing sleeves 23, 24 without being superimposed upon each other, the abutment rollers 29, 30 do not abut on the same peripheral surface of the photosensitive member 1, which lengthens life of the photosensitive member 1.

Moreover, while the distance between the first developing sleeve 23 and the second developing sleeve 24 is maintained to be constant, one developing sleeve can independently be rocked/pressed. Therefore, the components can highly precisely be positioned with a simple constitution.

In the aforementioned embodiment, the image forming apparatus for forming a monochromatic developer image as shown in FIG. 4 has been described, but the present invention is not limited to the apparatus, and can also be applied to the following image forming apparatus.

For example, a plurality of image forming portions shown in FIG. 4 are disposed for respective toner colors (yellow, magenta, cyan, black), and toner images formed on the respective photosensitive members are sequentially superimposed and transferred onto the transferring material P. In this manner, the present invention can also be applied to a full color image forming apparatus for forming a full color image. In this case, a medium to which the toner image is transferred from the photosensitive member may be a so-called known intermediate transfer member. That is, the constitution comprises sequentially superimposing and primarily transferring the toner images of the respective photosensitive members onto the intermediate transfer member, and collectively and secondarily transferring the full color toner image of the intermediate transfer member onto the transferring material P.

Moreover, the present invention can also be applied to another image forming apparatus. In the apparatus, a plurality of developing devices 21 are disposed for the respective toner colors (yellow, magenta, cyan, black) on the photosensitive member. Furthermore, a step of transferring the toner image formed on the photosensitive member to the transferring material P held by a transfer belt or another transferring material bearing member is repeated to form the full color image on the transferring material P. In this case, similarly, the medium to which the toner image is transferred from the photosensitive member may be a so-called known intermediate transfer member. That is, the constitution comprises sequentially superimposing and primarily transferring the toner images of the photosensitive member onto the intermediate transfer member, and collectively and secondarily transferring the full color toner image of the intermediate transfer member to the transferring material P.

Furthermore, the present invention can also be applied to another image forming apparatus. In the apparatus, a plurality of developing devices 21 are disposed for the respective toner colors (yellow, magenta, cyan, black) on the photosensitive member, a developing step is repeatedly performed on the photosensitive member, the full color toner image is thereby formed on the photosensitive member, and subsequently the image is collectively transferred to the transferring material.

What is claimed is:

1. An image forming apparatus comprising:

a rotatable image bearing member for bearing an electrostatic image;

a first developer carrying member for carrying a developer and developing the electrostatic image, which is opposed to the image bearing member with a first gap;

a first pair of regulating members-for regulating the first gap, said first pair of regulating members being in contact with one end portion and the other end portion in a rotation axial direction of said image bearing member, respectively;

a second developer carrying member for carrying a developer and developing the electrostatic image, which is disposed downstream of said first developer carrying member in a rotating direction of said image bearing member and is opposed to the image bearing member with a second gap; and a second pair of regulating members-for regulating the second gap, said second pair of regulating members being in contact with one end portion and the other end portion in the rotation axial direction of said-the rotation axial direction of said image bearing member, respectively, wherein positions at which said first pair of regulating members are in contact with said image bearing member are longitudinally displaced from positions at which said second pair of regulating members are in contact with said image bearing member.

2. The apparatus according to claim 1, further comprising a developer container, which contains a developer, and which has said first developer carrying member disposed in an opening portion opposite to said image bearing member, wherein said second developer carrying member is disposed in said opening portion with a gap between said first developer carrying member and said second developer carrying member, and carries the developer with a layer thickness which is restricted by the gap.

3. The apparatus according to claim 2, wherein a rotation direction of said first developer carrying member is the same as a rotation direction of said second developer carrying member.

4. The apparatus according to claim 3, wherein in a first developing area, a movement direction of a surface of said first developer carrying member is the same as the movement direction of the surface of said image bearing member, and in a second developing area, a movement direction of a surface of said second developer carrying member is the same as the movement direction of the surface of said image bearing member.

5. The apparatus according to claim 4, wherein in the first developing area, a peripheral speed of said first developer carrying member is higher than a peripheral speed of said image bearing member, and wherein in the second developing area, a peripheral speed of said second developer carrying member is higher than the peripheral speed of said image bearing member.

6. The apparatus according to claim 1, wherein a distance between said second pair of regulating members is shorter than a distance between said first pair of regulating members.

* * * * *

UNITED STATES PATENT AND TRADEMARK OFFICE

CERTIFICATE OF CORRECTION

PATENT NO. : 7,199,898 B2
APPLICATION NO. : 09/875015
DATED : April 3, 2007
INVENTOR(S) : Masanari Shirai It is certified that error appears in the above-identified patent and that said Letters Patent is hereby corrected as shown below:

COLUMN 1:
Line 9, "processing" should read --process--.

COLUMN 7:
Line 19, "members-for" should read --members for--.
Line 22, "-the rota-" should be deleted.
Line 23, "tion axial direction of said" should be deleted.

Signed and Sealed this

Twentieth Day of November, 2007

JON W. DUDAS
*Director of the United States Patent and Trademark Office*